Jan. 12, 1960      B. O. MOORE      2,920,516
MAGNETIC DEVICE FOR APPLYING ANTISKID CHAINS
Filed Dec. 10, 1957
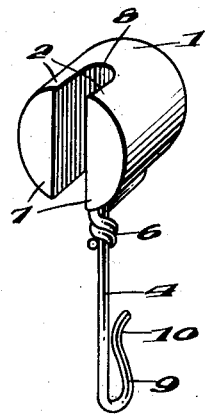
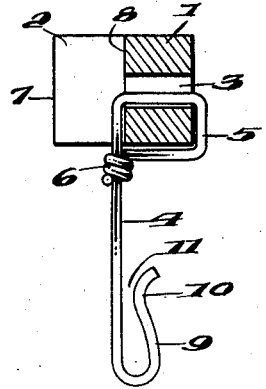
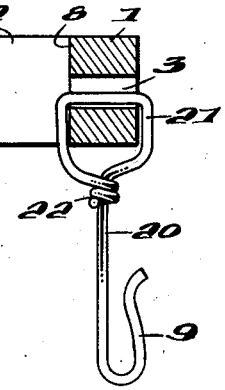
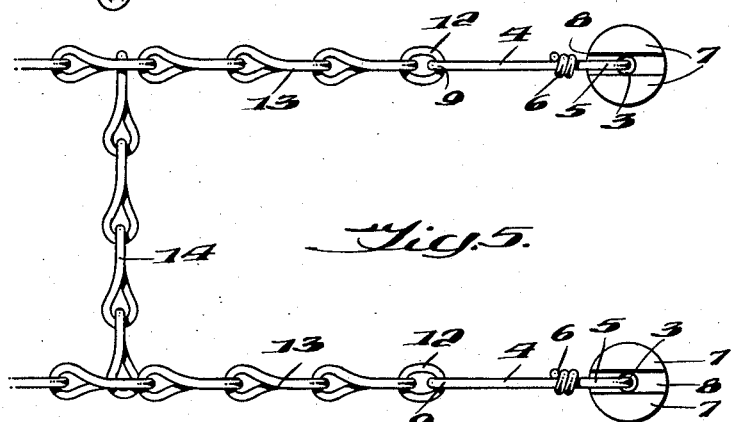
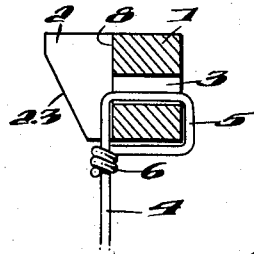
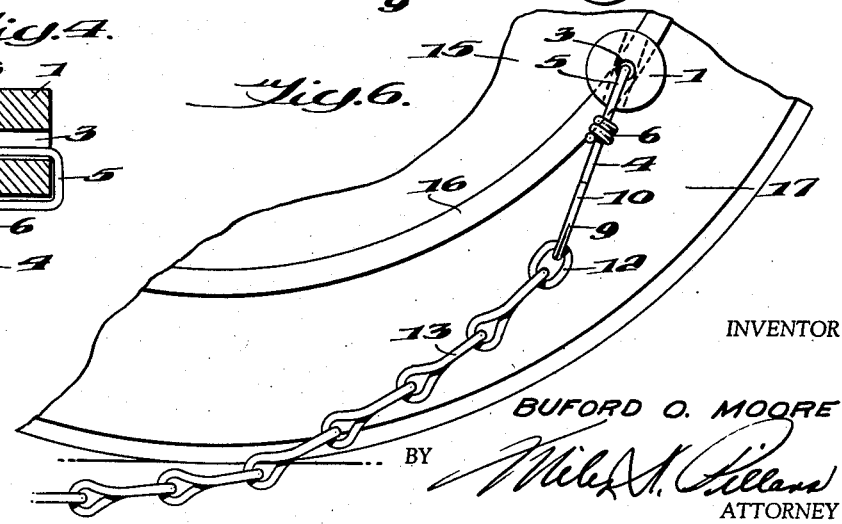
INVENTOR
BUFORD O. MOORE
BY
ATTORNEY

United States Patent Office 2,920,516
Patented Jan. 12, 1960

2,920,516

MAGNETIC DEVICE FOR APPLYING ANTISKID CHAINS

Buford Owen Moore, Middletown, Ohio

Application December 10, 1957, Serial No. 701,750

2 Claims. (Cl. 81—15.8)

This invention relates to antiskid devices for the tires of standard automotive vehicles. More particularly, the present invention relates to a magnetic device for installing antiskid chains.

It is an object of this invention to provide a facile means for applying standard tire chains to standard vehicle wheels. More particularly, this invention relates to the use of magnetic means to facilitate the normal installation of conventional automotive antiskid devices.

It is common knowledge that during the occurrence of slippery road conditions all motorists must take some form of precautionary measure to prevent skidding of the vehicle which they drive. Although such precautions take a variety of forms they may generically be classified in the following fashion: (1) the employment of tires whose tread is specifically designed to increase traction, (2) the covering of standard tires by various devices devised to increase traction, and (3) the employment in desired physical locations of external friction agents such as sand, ashes, coal and the like. Obviously, the first of these methods entails both foresight and capital expenditure. While this system may be practical for a few of the Northern states, it is not desirable throughout the country. Additionally, it is manifest that such tires are at best a relatively poor substitute for other available antiskid devices. The third method is relatively excellent, but applications thereof must of necessity entail both hindsight and foresight not generally available to motorists.

Accordingly, the vast majority of motorists must rely on the second method mentioned above: namely, the addition of antiskid devices to standard tires. Such devices may be and commonly are designated as tire chains and may be required by law as a prerequisite to vehicle operation. Although the desirability of the use of such devices is dictated by simple logic, and although such devices are, in fact, generally employed by the vast majority of motorists where slippery road conditions exist or are contemplated, and even though such devices are available commercially in a wide variety of forms, it is common knowledge that possession of such devices does not per se afford solution of the problem.

To solve this problem it is essential that such antiskid devices, i.e. "chains," be rigidly attached to, at least, each of the rear wheels of the automobile or other vehicle under consideration. While all manufacturers of such devices delineate the ease of installation of such chains, it is common knowledge that such is not the case. Conversely, it is necessary for most motorists to drive to the nearest garage or other automotive service facility and have such devices installed by first having the rear of the vehicle elevated and then having the devices applied to the rear wheels. Manifestly, such a procedure entails expenditure of time and money and inherently depends upon ability to drive to such a service facility under hazardous road conditions.

It has been an object of the art pertaining to antiskid devices to provide ready means by which such devices may be applied to vehicular wheels by the normal vehicle operator or owner. Many suggestions contained in this prior art relate to so-called "back-on" devices, i.e. antiskid devices which may be laid upon the road, covered as it may be with snow or ice, and thereafter may be applied to the vehicle wheels by a two-stage process: (1) attaching one end of the chain to the wheel and (2) backing the vehicle to rotate the wheel and place the remainder of the chain on the wheel. While such a procedure is both simple and desirable, it has never been employed to any large extent commercially. As a corollary to the above-mentioned development the prior art has taught or suggested many means to facilitate the retention of installed chains upon vehicular wheels, including magnetic means. These suggestions in most instances, particularly as to magnets, have proven themselves to be inoperative or impractical. In consequence in most instances such magnet structures also have never been adopted commercially.

I have made the simple, but basic, discovery that these two approaches of the prior art are fundamentally each correct and are also compatible so that, while neither will function satisfactorily alone, together they provide a simple and effective means to solve this problem. The inherent defect of all "back-on" chains installations has been the ease or lack thereof of initial attachment of the chain to the tire. Conversely, the major defect of most chain fixtures has been either (1) easy installation but poor retention or (2) excellent retention but difficult installation. Suggested among the former solutions have been magnetically retained chains. Obviously, this system is impractical because such magnets must be either permanent or electromotivated. The latter system perforce requires impossible commutation and supply; the former system demands a magnet size and strength utterly impossible for practical purposes. The result has been no utilization of magnets for commercial tire chains.

I have discovered that simple, compact and small permanent magnets, while of no use as permanent tire chain retainers, are both feasible and desirable as temporary chain retainers for the back-on application of chains. I have found and demonstrated that by combining such magnets with back-on chains the average motorist is enabled easily to apply chains to vehicle wheels without extraneous aid. This discovery will be more readily apparent by examination of the following written description taken in conjunction with the accompanying drawing in which:

Fig. 1 is a perspective view of a magnetic antiskid chain-attaching device embodying this invention;

Fig. 2 is a sectional elevational view of the magnetic antiskid chain-attaching device shown in Fig. 1;

Fig. 3 is a sectional elevational view of a modified embodiment of this invention;

Fig. 4 is a fragmentary elevational sectional view of another modification of this invention;

Fig. 5 is a plan view illustrating an antiskid tire chain with magnetic attaching devices applied thereto and showing the arrangement prior to attachment to a wheel; and Fig. 6 is a fragmentary elevational view of a wheel and antiskid chain provided with an attaching device embodying this invention illustrating its use in installing the chain on the wheel.

Referring to the drawings, the preferred embodiment of this invention is shown in Figures 1 and 2, and the useful application of this device generally is illustrated in Figs. 5 and 6. As previously explained, this invention relates specifically to a device for temporarily attaching the conventional anti-skid chains to a conventional vehicle wheel during the installation of such chains. After the devices have been used in applying chains to vehicle wheels, they are removed from the chains and suitably stored until such time as they may again be desired for again installing chains on the wheels. It is highly desirable therefore that the devices should be small and compact and that the magnetic characteristics thereof should be as permanent as possible. Well known iron, aluminum, cobalt, and nickel have been found especially practical in making the magnets of these new chain installing devices. In order to obtain the maximum magnetic strength for a given size device, it has been found desirable to make the major magnetic attaching part of the device in the form of a horseshoe magnet having a body 1 and a pair of legs 2 extending axially therefrom. The construction illustrated in the drawing shows this magnet as having a substantially cylindrical outer configuration, although any suitable cross section, such as square or otherwise, can be used. The substantially U-shape of the permanent magnet lends itself especially well to a simple and practical attachment of a securing means thereto.

As is more clearly shown in Fig. 2, an axially extending passageway 3 is formed substantially centrally through the base or body portion 1 of the magnet, intermediate the two legs 2 in the same direction as a center line between these two legs. In this preferred embodiment the attaching member comprises an elongated link, preferably formed of relatively stiff steel wire, having a main body portion 4 thereof extending substantially perpendicularly to the axis of the magnet. An integral extension of the wire forming the link extends through the passageway 3 and curves around the body 1 of the magnet in a return bend 5, with the end 6 of the wire firmly twisted or otherwise secured to the main body portion of the link for permanently affixing the link to the magnet. In order to minimize the leverage of the link on the magnet about the outer faces 7 which are adapted to engage the rim of a wheel, the main body 4 of the link preferably extends substantially in a straight line with the outermost side 8 of the body 1 nearest the attaching faces 7, that is, with the bottom of the slot between the legs 2. This places the link as near as possible to the attaching faces 7, so as to minimize its leverage thereabout, while maintaining a substantially rigid attachment of the link to the magnet.

In order readily to secure the chain installing device to a skid chain with which it is to be used, the end of the link opposite the end thereof which is affixed to the magnet is formed as a spring hook 9 having a snap latching end 10 which can easily be hooked through a link of a skid chain and also be readily detached therefrom, while providing a latched attachment thereto due to the relatively narrow space 11 between the latching end 10 and the adjacent portion of the main body 4 of the link. This hook end of the improved chain attaching device preferably is secured to an end link 12 on each side of a conventional skid chain, as shown in Figs. 5 and 6, although it can also be attached to any other suitable link of the chain.

As best illustrated in Fig. 5, an antiskid chain, with which the present invention is adapted to be used, may be of any conventional design and may suitably include two side chains, formed of links 13 joined together by a series of cross link chains 14, which may have thereon barbs or other means known to the art for increasing the effective traction thereof on ice, snow, or the like. It should be again emphasized that all of the antiskid chain with the exception of the link magnetic attaching device is of standard conventional form known to the art.

In accordance with the present invention such standard tire chains are easily installed by the back-on system. Obviously this invention may also be utilized in the wheel rotation system or similar elevational methods of tire chain installation.

To employ the device of this invention, it is only necessary to complete a series of simple, easily performed steps, as follows, at least one magnetic device being utilized on each side of a wheel 15. Each hook 9 of each magnetic device is first clasped to one chain link, such as the end link 12. Following this, each magnet is magnetically attached to one wheel rim 16, with the magnets 11 preferably substantially axially aligned opposite each other transversely of the rim. Thereafter, wheel 15 is rotated in a direction to draw the skid chain thereover. This may be accomplished by either the back-on or elevational rotation systems, although the former is preferred because its essential simplicity is rendered practical by the present invention.

After the antiskid chain completely encompasses the tire 17 on the wheel 15, the ends thereof are rigidly affixed together by conventional clasp or fastener means.

It is manifest that thereafter, i.e. during normal vehicle operation, the magnetic chain attaching devices have no further function whatsoever in retaining the skid chain on tire, so that no work or functioning strength is required from magnets during this vehicular operation. The magnetic attaching devices are, therefore, preferably removed after the clasps have been fastened. It is obvious that more than one such attaching device may be utilized on each side of a skid chain, if this is found to facilitate installation.

In Fig. 3 another embodiment of this improved antiskid chain attaching device is shown, which includes substantially the same magnetic member as that shown in Figs. 1 and 2, that is the magnet is formed as a substantially U-shaped member having a body portion 1, with a pair of legs 2 extending substantially axially therefrom. An axially extending opening or passageway 3 is formed substantially centrally through the main body 1 of the magnet and opens into the body surface 8 between the two legs 2, extending in the same direction as a center line between these legs. In this embodiment, the link member also preferably is formed of a relatively stiff wire having a main body portion 20, extending substantially perpendicularly to the axis of the magnet and secured thereto by a loop 21 which extends from the end of the main body portion 20 around the magnet body 1 through the passageway 3. The end 22 of the loop is securely connected to the main body portion by suitably twisting it around the end of the body portion 20 or otherwise fastening it thereto. In this construction, the body 20 of the link is removed axially from the inner surface 8 of the magnet, and this may be found practical where a wheel rim may be relatively small transversely of the wheel, so that the skid chain must extend around a relatively large tire.

The chain attaching end of the link preferably is formed as a spring hook 9, substantially the same as that shown in Figs. 1 and 2, and its use is essentially the same as that previously described.

A further embodiment of this invention is shown in Fig. 4, in which the attaching link and hook member is shown as being substantially the same as that in Figs. 1 and 2, although it may equally well be formed with the configuration of the embodiment shown in Fig. 3. Under certain conditions and with certain types of wheel rims, it may be found desirable not to have a plane outer attaching face on the legs 2 of the magnet. Since the magnet in most instances will be attached to the wheel rim at an angle thereto and not exactly radially thereof, it may be found desirable to provide an angle to the outer faces of the magnet legs 2 corresponding generally to the angle of the wheel rim to the axis of the wheel. In the embodiment shown in Fig. 4, each leg 2 of the magnet is formed with an angularly extending face 23 of this type in order to provide a surface to the magnet which has a greater rim engaging area and, therefore, provides for a greater effective magnetic attaching force of the magnet to the rim. Obviously various other configurations of the rim engaging face 23 may be provided, and these may be in the form of plane surfaces, concave surfaces, or convex surfaces to meet the various requirements of complementary surfaces on the rims of the vehicle wheels.

While particular embodiments of this invention have been illustrated and described, modifications thereof will occur to those skilled in the art. It is to be understood, therefore, that this invention is not to be limited to the particular arrangements disclosed, and it is intended in the appended claims to cover all modifications within the spirit and scope of this invention.

I claim:

1. An automotive antiskid tire chain installing device comprising, in combination, a permanent magnet having a body portion with a longitudinally extending passage substantially centrally therethrough and a pair of leg portions extending longitudinally from one end of said body portion forming a U-shaped magnet with a passage through said body portion substantially midway between said leg portions and along a center line between said leg portions, each of said leg portions having a face extending angularly relative to the longitudinal direction of said leg portions, and a hook secured to said magnet for securing a tire chain to a wheel rim during installation of a chain by magnetically attaching said magnet to the wheel rim and said hook to a link of the side chain of the tire chain, said hook having a substantially straight stem and a loop on the end thereof extending through said passage through said magnet and offset to one side of said stem so as to secure said hook to said magnet with said stem extending substantially in the plane of said one end of said body portion.

2. An automotive antiskid tire chain installing device comprising, in combination, a U-shaped permanent magnet having a body portion with a passage therethrough and leg portions extending longitudinally from one end of said body portion in the same direction as said passage and having faces angularly disposed relative to the longitudinal direction of said leg portions, said passage extending longitudinally with its axis substantially along a center line between said leg portions, an elongated link having a main portion and an end thereof extending through said passage and rejoined to the main portion of said link, said main link portion extending substantially perpendicular to a center line between said magnet leg portions, and means including a spring hook formed on the opposite end of said link from said magnet for securing a tire chain to a wheel rim during installation of the chain by magnetically attaching said magnet to the wheel rim and said hook to one of the links in the side chain of the tire chain.

References Cited in the file of this patent
UNITED STATES PATENTS

| | | |
|---|---|---|
| 1,932,143 | Piercy | Oct. 24, 1933 |
| 2,100,819 | Salley | Nov. 30, 1937 |
| 2,615,738 | Johnson | Oct. 28, 1952 |
| 2,630,155 | Kandel | Mar. 3, 1953 |
| 2,731,059 | Ford | Jan. 17, 1956 |